F. M. BACON.
Cotton-Planter.

No. 50,089.

Patented Sept. 26, 1865.

WITNESSES:
R. Hermon
W. M. Sargent

INVENTOR:
F. M. Bacon

UNITED STATES PATENT OFFICE.

FRANK M. BACON, OF RIPON, WISCONSIN.

IMPROVEMENT IN COTTON-SEED PLANTERS.

Specification forming part of Letters Patent No. 50,089, dated September 26, 1865.

*To all whom it may concern:*

Be it known that I, FRANK M. BACON, of Ripon, in the county of Fond du Lac and State of Wisconsin, have invented, made, and applied to use a certain new and useful Improvement in Cotton-Seed Planters; and I do hereby declare the following to be a full, clear, and exact description of my said invention, reference being had so the annexed drawings, making part of this specification, wherein—

Figure 2:
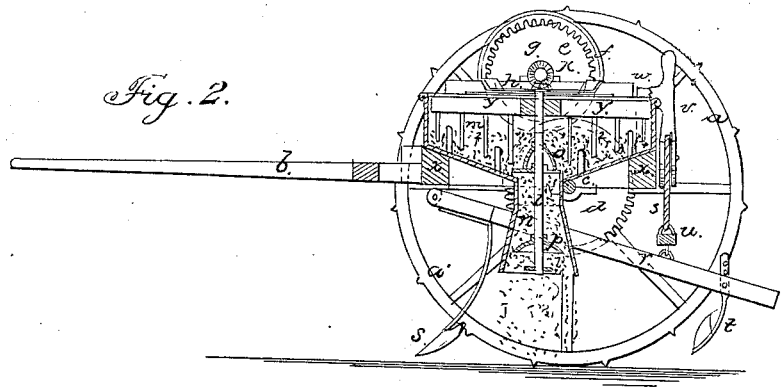
Figure 1:
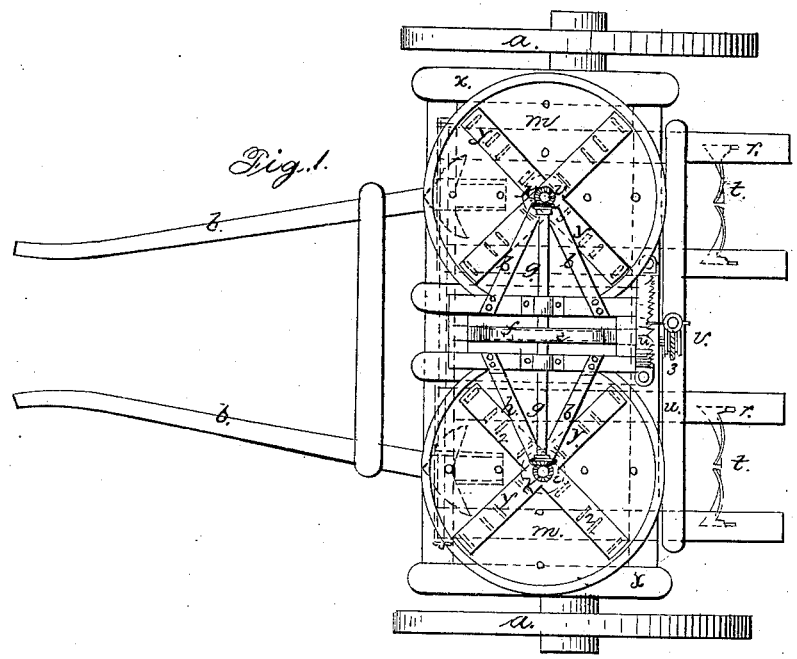

Figure 1 is a plan of my said planter, and Fig. 2 is a section of the same through the hopper.

Similar marks of reference are used to indicate the same parts.

Agitating devices have heretofore been employed for separating the cotton-seeds from each other and causing them to fall away from a spout or delivering-chute.

The nature of my said invention consists in a hopper receiving the seed, in combination with a series of revolving stirrers and a central discharge-opening with a regulating and scattering disk; and I employ plows to turn the furrow in front of the hopper, and covering-plows coming behind and burying the seeds.

In the drawings, *a a* are the wheels on the axle *c*, to which they may be connected by a ratchet and pawl, so as to allow of turning the machine, but rotate the axle when the machine is drawn forward.

*x* is a frame on the axle, to which the shafts *b b* are connected.

A gear-wheel, *d*, on the axle *c* is employed to rotate the wheel *e* and horizontal shaft *g*, which is parallel, or nearly so, to the axle *c*, and is sustained in suitable bearings. At the ends of this shaft *g* are bevel-gears *k* that rotate the vertical shafts *i i*, which shafts *i* are each sustained by a frame, *h*, at the upper end and by a step, *l*, at the lower end. The shafts *i* are central to hoppers *m m*, that are formed with a rim and inclined bottom terminating in a vertical spout or conduit, *n*.

Upon the inclined surface of the hopper are studs 1 1, and the shafts *i* are provided with arms *y y*, that carry pendent stirrers 2 2, that, in connection with the studs 1 1, keep the cotton-seeds in agitation, and insure their feeding down the hopper instead of becoming clogged together by the lint that adheres to the seeds.

Upon the shafts *i* are adjustable regulators *o*, that determine the amount of opening through the spout *n*, according to the proximity of said regulator to the upper end of the spout *n*. This regulator *o* to each hopper may be raised or lowered by hand and held by a spring-clamp or by an adjustable nut. Upon each shaft *i* and within the spout *n* is a scatterer, *p*, that causes the cotton-seeds, as they pass down the spout *n* in a regulated quantity and separated from each other, as aforesaid, to fall broadcast upon the ground or into the furrows provided for them. I have shown two hoppers, each constructed and operating as aforesaid. The number may be increased or only one be employed.

*r* is a hinged frame carrying the plows *s* to open the furrow and the covering-plows *t*. This frame and plows may be raised when not in work by any desired device. I have shown the cross-bar *u*, cord or chain 3, eccentric sheave and lever *v*, held by the notched segment *w* at any point to which the said lever *v* may be placed, and the plows and frame raised and lowered. I have shown a guard, *f*, over the wheel *e*.

What I claim, and desire to secure by Letters Patent, is—

1. A horizontal hopper with a central discharge-opening, in combination with the stirrers or agitators, actuated substantially as specified.

2. The adjustable regulator *o* on the shaft *i*, in combination with the hopper *m* and agitators, for the purposes and substantially as specified.

In witness whereof I have hereunto set my signature this 21st day of July, 1865.

F. M. BACON.

Witnesses:
 R. HERMON,
 WM. M. SARGENT.